Patented Oct. 7, 1941

2,257,808

UNITED STATES PATENT OFFICE 2,257,808

PURIFICATION OF SAND

Donald S. Phelps, Harvard, Mass., assignor to Edgar Plastic Kaolin Company, Metuchen, N. J., a corporation of New Jersey No Drawing. Application July 29, 1940, Serial No. 348,287

6 Claims. (Cl. 209—166)

This invention relates to the purification of sand and in one notably important aspect, relates to the treatment of glass sand or quartz to remove impurities, particularly ilmenite, magnetite, and rutile. Thus for instance, a number of crude sands, while containing a high percentage of silica and being otherwise acceptable to the glass industry, have been found to contain quantities of contaminating materials such as iron, titanium, and also alumina, to such extent as to prevent use of the sand by that industry.

By way of example, the following is an analysis of a typical crude sand which is obtained in the vicinity of Edgar, Florida:

| | Per cent |
|---|---|
| Silica, $SiO_2$ | 98.12 |
| Iron oxide, $Fe_2O_3$ | 0.14 |
| Alumina, $Al_2O_3$ | 1.43 |
| Titanium oxide, $TiO_2$ | 0.13 |
| Calcium oxide, CaO | 0.10 |
| Magnesia, MgO | 0.09 |

It will be understood that in the foregoing and other chemical analyses herein, the metallic constituents are determined as the specified oxides. Thus, rutile is represented by at least part of the titanium oxide, magnetite by at least part of the iron oxide, and ilmenite by at least parts of the percentages of iron and titanium oxide taken together. In general, sands of the character stated have been found to contain particles of each of the three minerals, although it will be understood that the invention is equally applicable to the treatment of sand containing a lesser number of varieties of such impurities. The alumina specified in the foregoing analysis is largely present as mica, but the sands tested have also been found to contain some clay, which is thus likewise represented by a part of the stated alumina content.

While specifications may vary somewhat in different cases, the following is understood to be a typical analysis of a glass sand containing approximate percentages of impurities of the character described which can usually be tolerated by the glass industry.

| | Per cent |
|---|---|
| Iron oxide, $Fe_2O_3$ | 0.015–0.03 |
| Titanium oxide, $TiO_2$ | 0.03 or less |
| Alumina, $Al_2O_3$ | 0.50 or less |
| Calcium oxide, CaO, and magnesia, MgO | 0.10 or less |
| Organic matter | Trace |
| Silica | 99.00 or more |

It will be understood that the lower the percentage to which each impurity may be brought below the maxima named in the above table, the more desirable will the material be for the glass manufacture; but the foregoing represents a satisfactory product, and one which, so far as has been ascertained, can not be produced economically from sands of the character described by previously available methods of cleaning or treatment.

Accordingly, an important object of the present invention is to provide efficient, economical, and improved procedure for treating sand to remove impurities of the type stated; other objects being to provide new and improved flotation procedure for the removal of such impurities from sand, and likewise to provide new flotation methods and new adaptations and combinations of reagents, whereby crude sand may be treated to reduce its impurity content to low percentages of the character required by the glass industry.

To these and other ends it has now been discovered that upon making a pulp of the fine crude sand, the undesired minerals may be floated, and efficient separation of them obtained from the sand itself, by a froth flotation treatment in the presence, for example, of the combination of wood creosote, a sulphonated oil, and a free fatty acid or soap, as flotation reagents. It has been found that upon such treatment, a clean and effective separation of the contaminating particles is obtained in the froth concentrate, and a very high recovery of the desired sand in the tailings; the impurity content of the tailings, particularly in ilmenite, magnetite, rutile, and alumina, being very desirably reduced, and there being very little loss of $SiO_2$ in the concentrate, other than what is present as mica and clay.

In some cases, it is advantageous to pre-treat the crude material to eliminate colloids or otherwise render them ineffective to impair the desired flotation operation; it having been found that even though the colloidal content of the material may be small, the effect may be very serious in preventing a good separation of the mineral impurities or in impairing the desired high recovery of sand in the tailings. Such pre-treatment may involve de-flocculation, or de-flocculation and preliminary decantation, of the colloidal material. For example, where the colloidal material must be removed from the crude sand, the latter may be made into a pulp containing about five to ten parts of water to one of solids. A suitable de-flocculant is added, such as sodium silicate, "Daxad 11" or "Daxad 23" or any one of a number of known de-flocculants, and after thorough mixing the pulp is allowed to settle until such time as only the colloidal material remains in suspension.

The suspended colloids are then decanted (such operation being similar, as will now be understood by those skilled in the flotation art, to procedures for colloid removal as a preliminary to flotation of other types of material), and if necessary, there may be a further settling and decantation, usually without the addition of further reagents. In some cases, dispersion without decantation may be all that is required, and, as intimated hereinabove, many crude sands will be found to be sufficiently free of colloidal material as not to necessitate any preliminary de-flocculation or like treatment at all. In any instance, it will now be understood that the nature of the crude sand, particularly with respect to the necessity of de-flocculation or other colloid treatment as well as with respect to actual amounts of reagents and other conditions of the flotation operation itself, may be readily and simply determined by tests in any given case.

According to presently preferred procedure, the crude sand (after preliminary colloid treatment, if necessary) is made up with water into a pulp which may conveniently contain 30 to 50 per cent solids,—a relatively high solids content thus being advantageously obtainable for the achievement of a high capacity or production rate. Either prior to the introduction of the pulp to the flotation machine or upon such introduction the reagents are added, viz. a sulphonated oil, preferably in the form of a substantially pure sulphonate, a wood creosote, and a free fatty acid or soap. Froth flotation is then carried on until the removal of the floatable minerals is completed. The flotation operation is ordinarily quite rapid; a single charge, or the equivalent of a single charge of the machine, being satisfactorily cleaned in a time of the order of ten to fifteen minutes. Ordinarily, only one flotation operation is needed, i. e., providing a so-called rougher concentrate of the mineral impurities; it having been found that further operations are generally unnecessary (although unobjectionable from the standpoint of the condition of the final product) and particularly that a satisfactorily complete or maximum cleaning action on the tailings, with the removal of as much floatable mineral as possible, is afforded by a single flotation.

Although various types of flotation machines, for instance those of the mechanical type, may be used in some cases, particularly efficient operation has been obtained with apparatus wherein the pulp is directly aerated by blowing air or other gas into it. Thus, for example, good results have been had with the Callow type of froth flotation cell, wherein the aeration is directly obtained by blowing air through, and subdividing it with, a fine canvas screen beneath the pulp column. Especially advantageous operation has been achieved with a cell providing both direct aeration and self-agitation, and comprising a series of ducts extending down into a central pulp chamber for blowing air into the pulp, and adjacent frothing chambers to which the agitated and aerated pulp passes and in which a rising froth column, advantageously of substantial height, is produced to pass over into suitable collecting launders. It will be understood that in such cells the central chamber is preferably separated from the frothing chamber by depending baffles extending down into and slightly below the normal pulp surface, and that upon the vigorous injection of air, the pulp is not only aerated, but effectively agitated as it circulates in the central chamber and thence to the frothing chambers. Substantially submerged baffles, clearing the bottom of the cell, extend along each side of the series of air ducts in the central chamber to afford circulation over such baffles and under the other baffles, into the froth chambers.

As stated, the pulp and reagents are fed to the flotation apparatus and the operation carried on until the cleaning action is complete; such termination of the cleaning action,—which governs the rate at which continuous feed through the cell may be had in any given case,—may be conveniently ascertained, for example, by determining the time at which the froth substantially clears up or becomes free of any thing but minute quantities of sand. The tailings from the cell are suitably collected and their solid content, which may be separated in any desired manner, is found to comprise a good quality of sand suitable for use in the glass industry and generally containing no more than, and often less than, the maximum percentages of impurities specified hereinabove.

If desired, the concentrate may be further treated, conveniently by flotation, to recover the ilmenite, rutile, and magnetite. Such further cleaning operation, however, has no bearing on the recovery of sand by the procedure to which the present invention is principally directed and, indeed, would only be useful where the actual amount of the separated minerals would warrant treatment to save them.

In addition to the specified minerals of titanium and iron the concentrate of the invention usually carries off a considerable part of such mica as may occur in the original crude sand, i. e., mica as present in quantities of the order represented by the alumina percentage in the specific analysis given hereinabove, and the treatment likewise floats most of the clay which may similarly be associated with the crude sand in small quantities. There is also useful removal, by concentration, of a considerable part of such materials as calcium oxide and magnesia, found to be present by the above-recited analysis of the Florida sand. Although some content of the latter materials is not necessarily detrimental for glass manufacture in all cases, the industry generally prefers as complete purity of sand as possible, so as to give the glass manufacturer full freedom of choice in making his mix, without concern about the effect of extraneous mineral matter in the sand.

By way of specific example, a pulp made up in the proportion of about one part by weight of crude sand (having the analysis specifically set forth hereinabove) and three parts of water, was introduced into the flotation machine, which in this case was a Callow cell. No colloid removal or like special treatment was found necessary in this particular instance. The reagents were added to the pulp in the following proportions per ton of the crude sand (dry weight):

0.54 pound of creosote "No. 400" (being a satisfactory wood creosote manufactured by Pensacola Tar & Turpentine Co.), 0.4 pound of "Petroleum Dipex M" (made by Colonial Beacon Oil Co.), and 0.4 pound of White Crown soap (manufactured by Procter & Gamble)

Flotation was found to be completed in a short time. Particles of iron and titanium compounds, and mica, floated very well and likewise the relative small quantity of clay which the sand contained. The tailings were collected and found to consist of clean glass and having remarkably high purity, and representing a yield of 98.75%.

The following is a chemical analysis of the cleaned product thus recovered from the tailings, i. e., the purified sand made according to the present invention:

| | Per cent |
|---|---|
| Silica, $SiO_2$ | 98.75 |
| Alumina, $Al_2O_3$ | 0.16 |
| Calcium oxide, CaO | 0.03 |
| Iron oxide, $Fe_2O_3$ | 0.021 |
| Magnesia, MgO | 0.11 |
| Titanium oxide, $TiO_2$ | 0.07 |
| Organic matter (loss on ignition) | 0.11 |

By way of further example: a run was made in a cell of the combined aeration and agitation type described hereinabove, wherein the crude sand pulp contained about 50% solids, and reagents were added in the proportion, per ton of crude sand, of: 0.48 pound of creosote "No. 400," 0.12 pound of "Petroleum Dipex M," and 0.5 pound of White Crown soap. The tailings represented a yield of roughly 98% and they consisted of a clean glass sand, found to have the following chemical analysis:

| | Per cent |
|---|---|
| Silicon dioxide, $(SiO_2)$ | 98.41 |
| Iron oxide, $(Fe_2O_3)$ | 0.029 |
| Aluminum oxide, $(Al_2O_3)$ | 0.90 |
| Titanium dioxide, $(TiO_2)$ | 0.038 |
| Calcium oxide, (CaO) | None found |
| Magnesium oxide, (MgO) | None found |
| Sodium oxide, $(Na_2O)$ | None found |
| Potassium oxide, $(K_2O)$ | 0.49 |
| Loss of ignition | 0.13 |

It will be noted that the purity of the products of these examples conforms closely, within the limits of analytical error in dealing with the small quantities of impurities, to the previously stated requirements of the glass industry. At the same time, the process is a simple and highly efficient one, requiring but a single flotation operation and involving only small quantities of relatively inexpensive reagents.

Although in some instances a moderately good cleaning action has been obtained without the use of the sulphonated oil, tests indicate that the coaction of the three reagents is substantially responsible for the remarkable results obtained. The exact function of the reagents and the peculiar cooperation which they exhibit for the simultaneous removal of a plurality of minerals that differ substantially among themselves, are not fully understood; but as stated, tests reveal that it is preferable to employ all three reagents. In many cases, other specific chemicals than those set forth by way of example may be used. Thus, other wood creosotes may be employed in many cases, examples being Cleveland Cliffs Creosote No. 1 or No. 2. "Petroleum Dipex M" is understood to consist of a pure sodium sulphonate, i. e., a sodium sulphonated mineral oil; it will be appreciated that equivalent materials may be substituted, notably other pure sulphonates. The soap is similarly susceptible of replacement, for instance, by other soaps, especially fatty acid (for example, Ivory soap) or by a free fatty acid such as oleic acid.

In general, the reagents are preferably employed in quantities of the order stated (per ton of dry sand) in the specific examples. Somewhat less of each chemical may be used in some cases, although with a tendency to less effectiveness in the cleaning action. Ordinarily, the addition of more than about one and a half pounds of soap or free fatty acid is undesirable, particularly in that it may cause considerable flotation of silica; an exception being where particularly hard water must be employed. In such cases, the soap or fatty acid content may be readily adjusted for compatibility to the condition of the water, as will be understood by those skilled in the art. Preferably and for like reasons (economy and an avoidance of silica flotation), the range below one pound per ton has been employed for each of all three reagents.

As stated, the flotation apparatus may be of various types, and, indeed, in continuous operation on a large scale following substantially the procedure of the specific examples, notably good results have been obtained with the previously described cell embodying both direct aeration and self-agitation, somewhat in preference to the Callow cell.

It will be understood that the invention is not limited to the specific procedures herein described, but may be extended to or employ equivalents, and may be carried out in other ways, without departure from its spirit.

I claim:

1. A method of removing iron and titanium compounds from sand, comprising establishing a pulp of the sand, subjecting the pulp to froth flotation operation in the presence of wood creosote, a sodium sulphonated mineral oil and material of the class consisting of oleic acid and fatty acid soap, to produce a froth concentrate of said compounds, and recovering the purified sand from the tailings.

2. A method of cleaning impure sand to produce a material useful in the glass industry, comprising establishing a pulp of the sand, and concentrating and separating impurities from the sand by incorporating in the pulp wood creosote and material of the class consisting of oleic acid and fatty acid soap, and aerating the pulp to raise an impurity-bearing froth concentrate, whereby purified sand accumulates in the tailings remaining from said froth concentrate.

3. A method of treating sand containing ilmenite, rutile and mica as impurities, to reduce the content of said impurities, comprising establishing a pulp of the sand, and subjecting the pulp to froth flotation operation in the presence of wood creosote, a sodium sulphonated mineral oil and material of the class consisting of oleic acid and fatty acid soap to produce a froth concentrate of said impurities and a recovery of purified sand in the tailings of the flotation operation.

4. A method of separating impurities such as ilmenite, magnetite, rutile, mica and clay, from sand containing small quantities of such impurities, comprising establishing a pulp of the sand, and subjecting the pulp to froth flotation operation in the presence of not more than about one pound of wood creosote per ton of dry sand, not more than about one pound of a sodium sulphonated mineral oil, and material of the class consisting of oleic acid and fatty acid soap, in quantity not less than about 0.4 pounds and insufficient to effect flotation of substantial amounts of silica, to produce a froth concentrate of the impurities.

5. The method of claim 1, wherein the sand contains an appreciable content of colloidal particles, and wherein the treatment includes, prior to froth flotation, incorporating a deflocculating agent in a pulp of the sand, for dispersion of the colloidal particles.

6. The method of claim 1, wherein the sand contains an appreciable content of colloidal particles, and wherein the treatment includes, prior to froth flotation, establishing a dilute pulp of the sand, incorporating a deflocculating agent therein, and after settling of all but the colloidal particles, decanting the liquid containing the latter.

DONALD S. PHELPS.

CERTIFICATE OF CORRECTION.

Patent No. 2,257,808.　　　　　　　　　　　　　　October 7, 1941.

DONALD S. PHELPS.

It is hereby certified that error appears in the printed specification of the above numbered patent requiring correction as follows: Page 3, first column, line 4, for "and" read --sand--; line 71, after the word "acid" insert --soaps--; and that the said Letters Patent should be read with this correction therein that the same may conform to the record of the case in the Patent Office.

Signed and sealed this 25th day of November, A. D. 1941.

(Seal)　　　　　　　　　　　　　　　　　　　　　Henry Van Arsdale,
　　　　　　　　　　　　　　　　　　　Acting Commissioner of Patents.